Oct. 13, 1942.  H. L. GRIFFIN ET AL  2,298,693
METHOD FOR STERILIZING MILK OR OTHER FOOD PRODUCTS
Filed Oct. 5, 1938  9 Sheets-Sheet 1
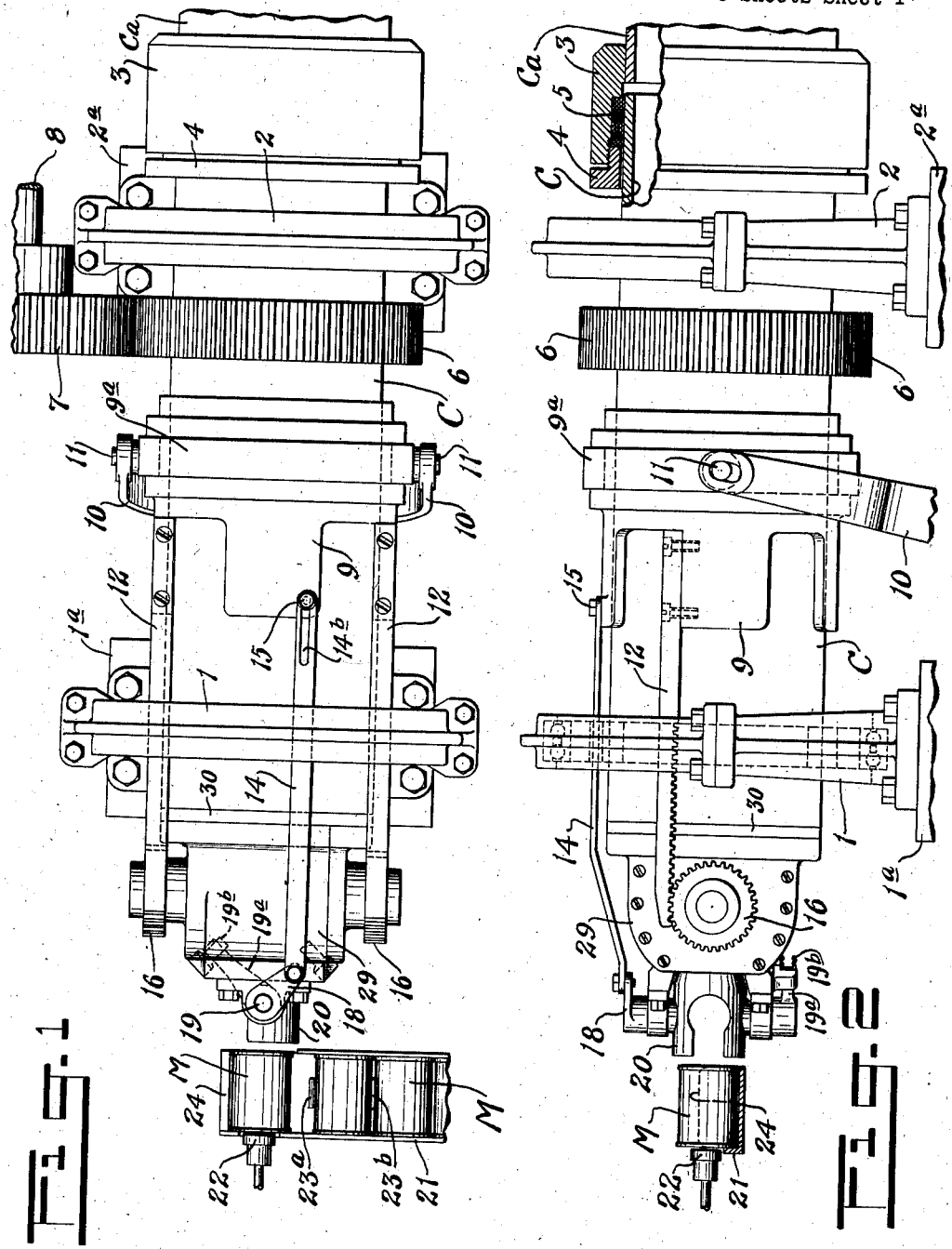
Inventors
HARRY L. GRIFFIN
ALEXANDER R. ROBB
ROLLA W. TITUS
HANS T. GEBHARDT
BY Mock & Blum
ATTORNEYS

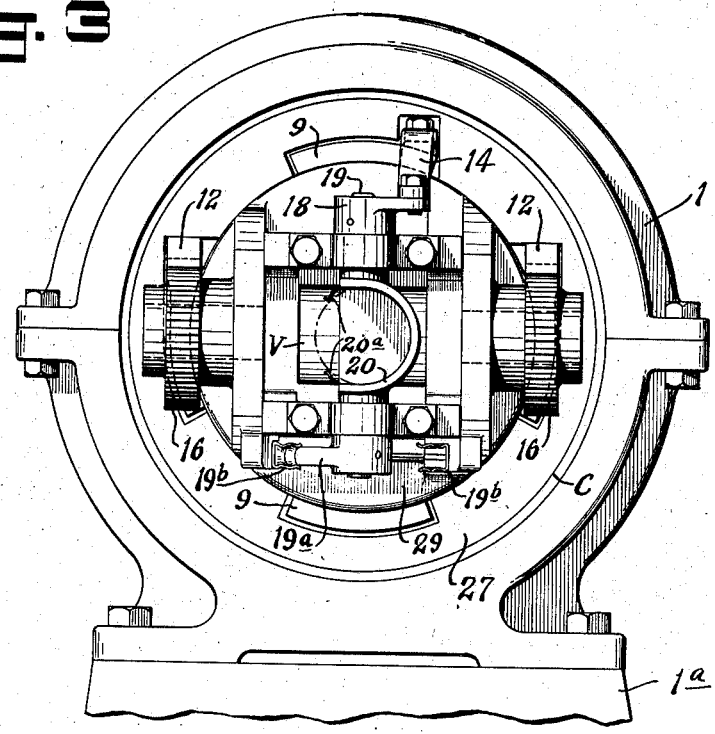
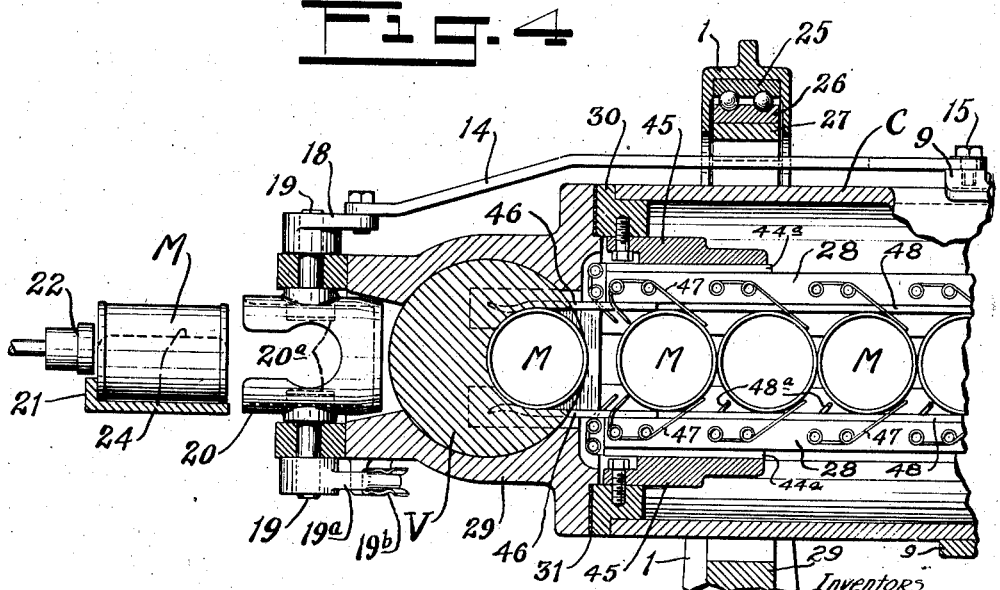

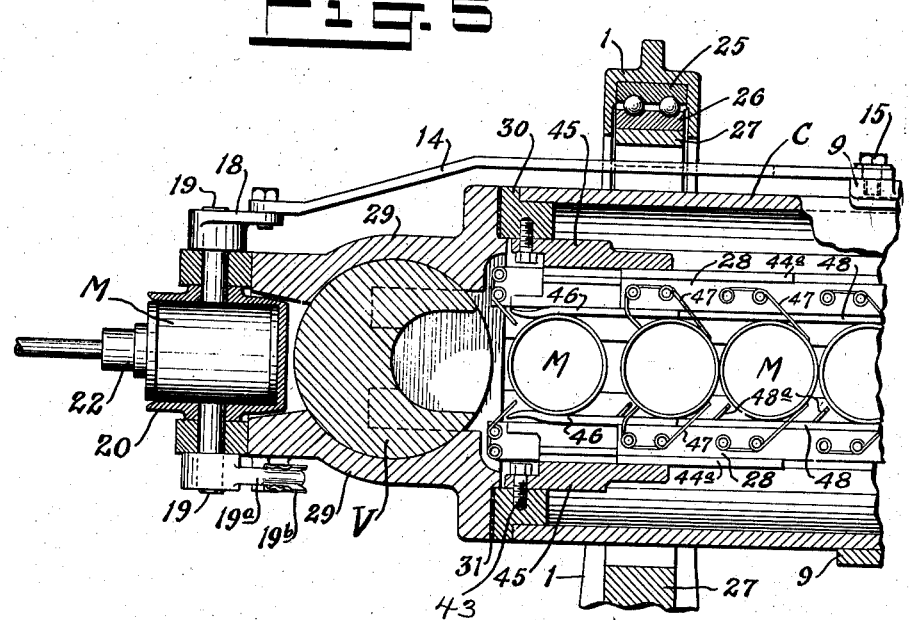
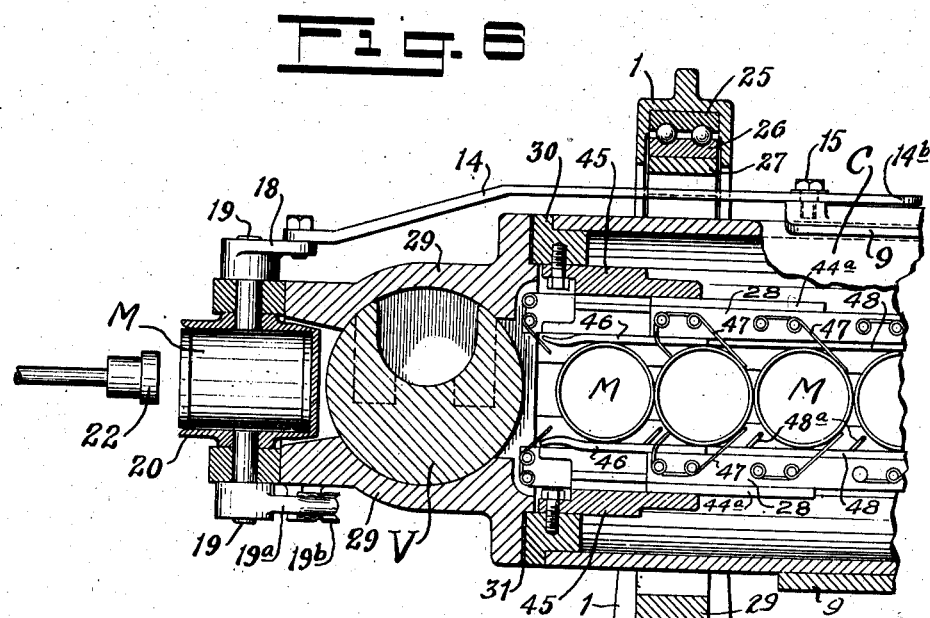

Oct. 13, 1942.  H. L. GRIFFIN ET AL  2,298,693
METHOD FOR STERILIZING MILK OR OTHER FOOD PRODUCTS
Filed Oct. 5, 1938  9 Sheets-Sheet 4

Inventors
HARRY L. GRIFFIN
ALEXANDER R. ROBB
ROLLA W. TITUS
HANS T. GEBHARDT
BY Mocko Blum
ATTORNEYS

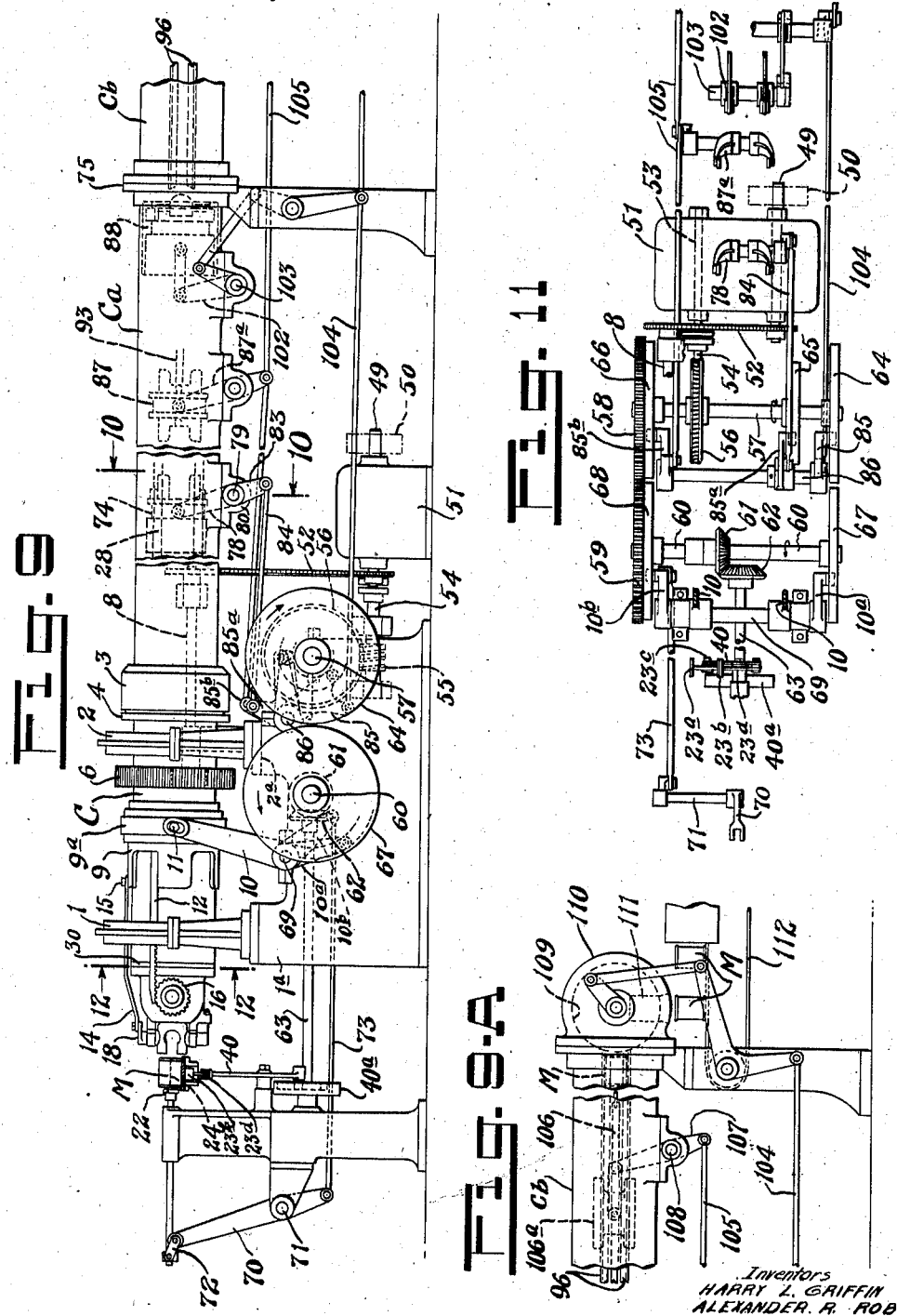

Oct. 13, 1942.   H. L. GRIFFIN ET AL   2,298,693
METHOD FOR STERILIZING MILK OR OTHER FOOD PRODUCTS
Filed Oct. 5, 1938   9 Sheets-Sheet 6
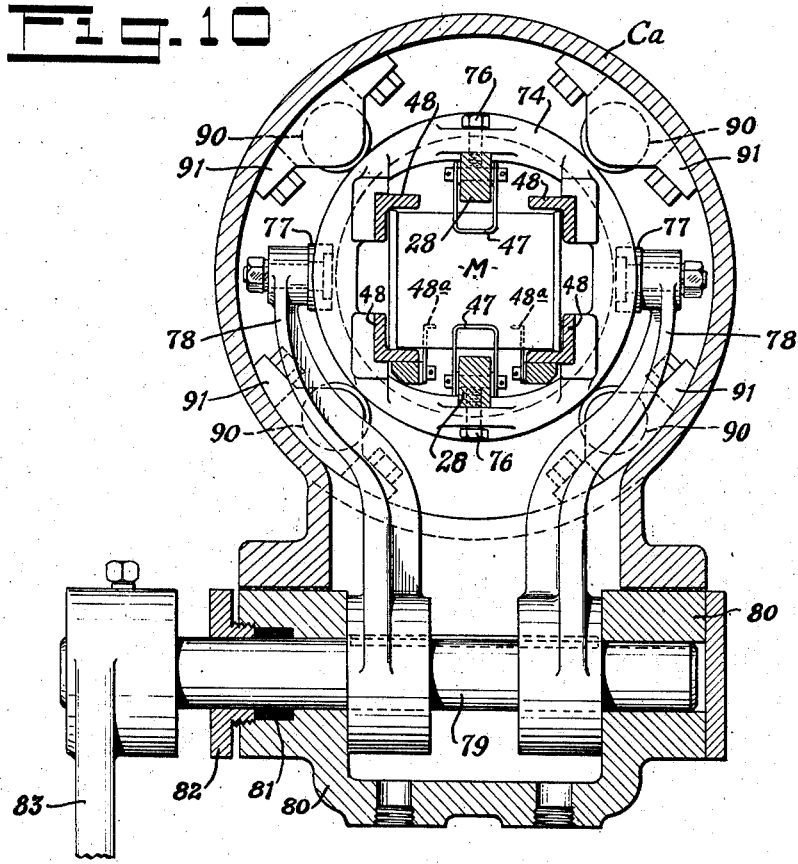
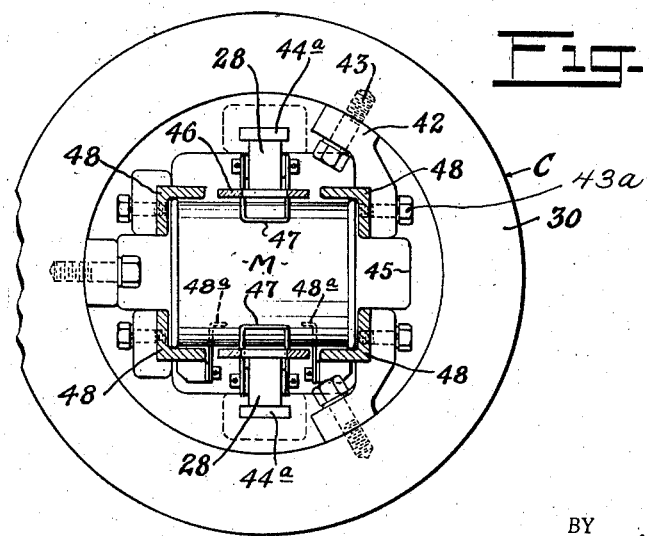
Inventors
HARRY L. GRIFFIN
ALEXANDER R. ROBB
ROLLA W. TITUS
HANS T. GEBHARDT
BY Mack & Blunn
ATTORNEYS Oct. 13, 1942.    H. L. GRIFFIN ET AL    2,298,693
METHOD FOR STERILIZING MILK OR OTHER FOOD PRODUCTS
Filed Oct. 5, 1938    9 Sheets-Sheet 7
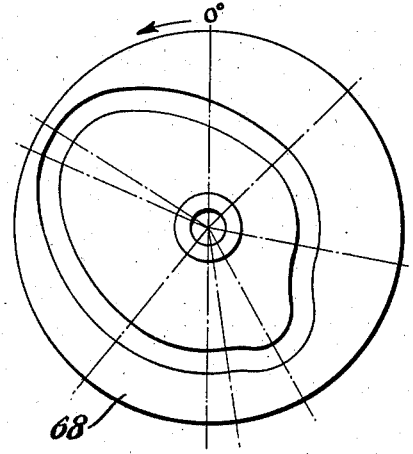
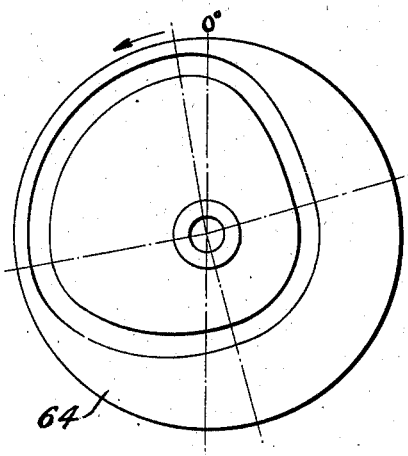
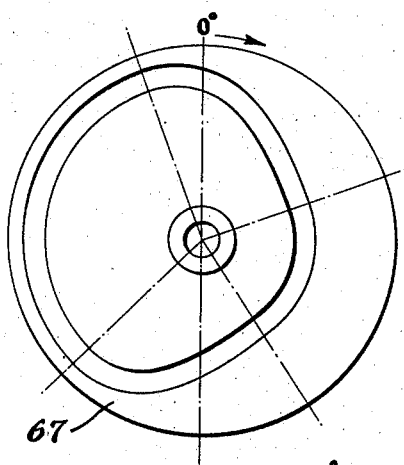
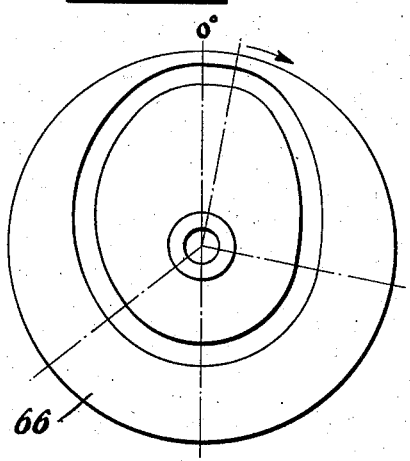
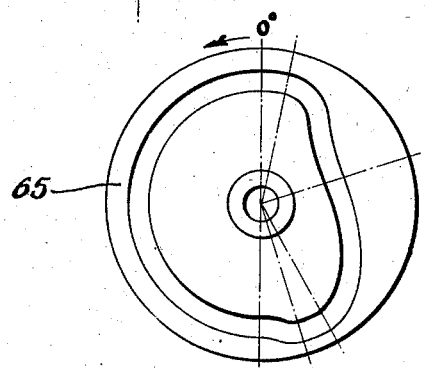
Inventors
HARRY L. GRIFFIN
ALEXANDER R. ROBB
ROLLA W. TITUS
HANS T. GEBHARDT
BY Mock & Blum
ATTORNEYS

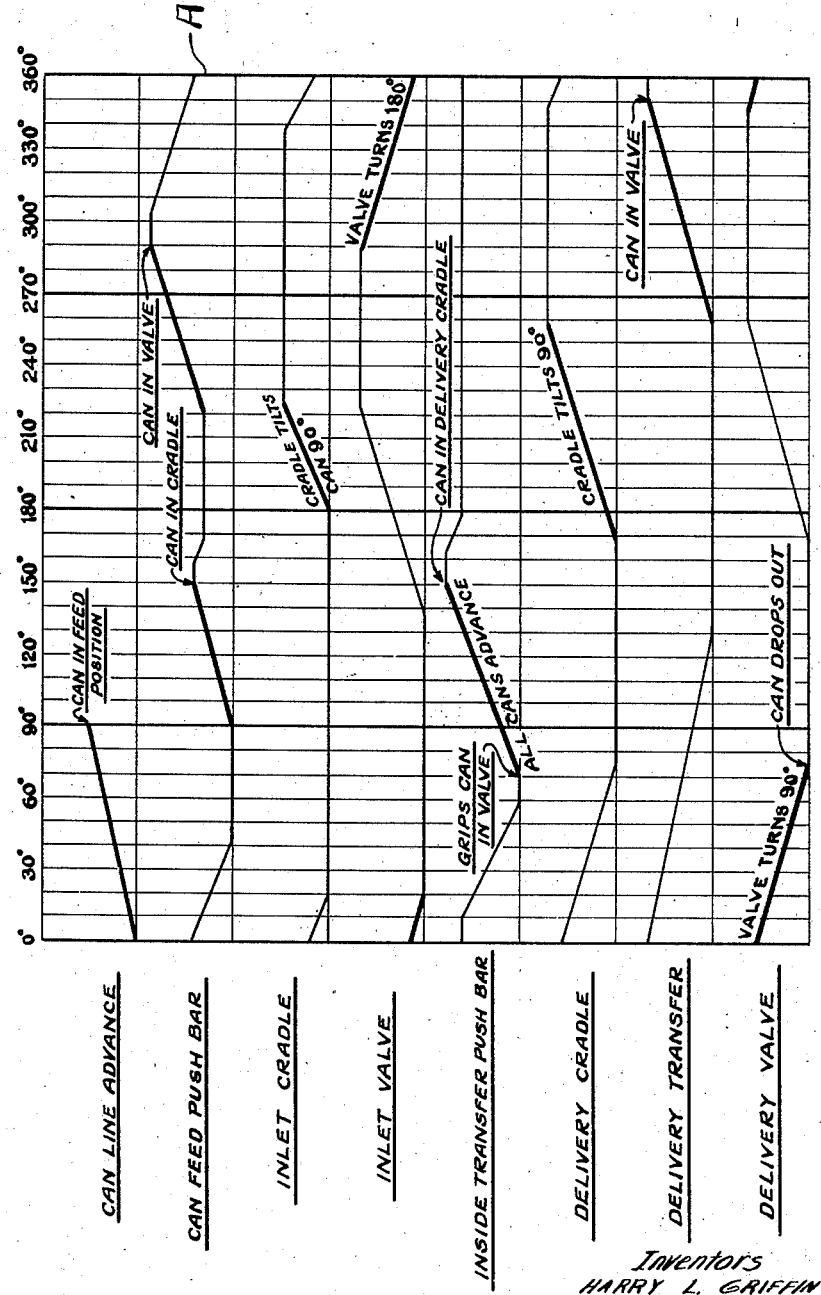

Oct. 13, 1942.   H. L. GRIFFIN ET AL   2,298,693
METHOD FOR STERILIZING MILK OR OTHER FOOD PRODUCTS
Filed Oct. 5, 1938   9 Sheets-Sheet 9

Inventors
HARRY L. GRIFFIN
ALEXANDER R. ROBB
ROLLA W. TITUS
HANS T. GEBHARDT
BY Mock & Blum
ATTORNEYS Patented Oct. 13, 1942

2,298,693

UNITED STATES PATENT OFFICE 2,298,693

METHOD FOR STERILIZING MILK OR OTHER FOOD PRODUCTS

Harry L. Griffin, Rockville Centre, and Alexander R. Robb, Valley Stream, N. Y., and Rolla W. Titus and Hans T. Gebhardt, Marysville, Ohio, assignors to Nestle's Milk Products, Inc., New York, N. Y., a corporation of New York Application October 5, 1938, Serial No. 233,374

10 Claims. (Cl. 99—185)

Our invention relates to a new and improved mechanism and method for sterilizing or processing milk or other food products.

One of the objects of our invention is to provide improved means and an improved method for sterilizing canned milk. This canned milk is preferably unsweetened evaporated milk in liquid form. According to the invention, after the cans have been filled with the milk, and the cans have been sealed, the milk can be sterilized in a short period of time.

Another object of the invention is to raise the temperature of the cans and their contents rapidly to a sterilizing temperature above 100° C. During the period in which the temperature of the cans is being raised, the cans are turned continuously end-over-end. For example, after the cans have been preheated to a temperature of about 210° F., the temperature of the cans and their contents can be raised rapidly to about 260° F. in a period of about forty-five seconds, while the cans are turned continuously end-over-end, if the cans are the "tall" or "baby" cans hereinafter mentioned. Larger cans will require a longer coming-up period.

Another object of the invention is to maintain the cans and their contents at a suitable high sterilizing temperature of about 260° F., in a holding period, after the period during which the cans are rapidly heated to said sterilizing temperature, the cans being held substantially stationary and being maintained substantially at 260° F. during this after-treatment. The period of this after-treatment or holding stage can be longer than the period during which the cans are rapidly heated to said sterilizing temperature. At said temperature of 260° F., most evaporated milk and many other products can be effectively sterilized in the first fifteen seconds to thirty seconds of this holding period. By making this holding period longer, the evaporated milk is processed so as to increase the stability of the milk, thus preventing the physical thickening thereof, even if the product is stored for several months. Likewise, the milk is given the required body and viscosity.

Another object of the invention is to cool the cans and their contents quickly while the cans are turned end-over-end, and also to subject the cans to external pressure during the cooling, so as to restore the cans to their original shape, as the heat treatment may distort the cans from their original shape. The cans are thus maintained in their original shape after cooling, and if the ends of the cans have bulged outwardly during the heat treatment, said ends are flattened to their original shape, by means of said external pressure.

Another object is to provide improved means for inserting the cans into a casing in which the cans are heated or cooled, and for removing the cans from said casing.

Another object of the invention is to prevent the milk from baking on the cans by continuously turning the cans end-over-end as the cans enter and also before the cans enter the heating chamber, and also while the cans are being raised to said temperature of about 260° F., until the temperature of the milk is substantially equal to the temperature of the cans, and of the heating chamber.

Another object of the invention is to provide simple mechanism for feeding and advancing the cans during a heating stage, or during a cooling stage, or during both stages, or while the cans are being turned end-over-end, and also during the holding period or stage during which the cans are not turned end-over-end.

Other objects of the invention will be set forth in the following description and drawings which illustrate a preferred embodiment thereof, it being understood that the above statement of the objects of our invention is intended generally to explain the same without limiting it in any manner.

Fig. 1 is a top plan view showing the inlet portion of apparatus in which cans of milk may be treated according to the invention, and also showing a conveyor by means of which the cans are delivered to said inlet end and also showing mechanism for transferring the cans from said conveyor to the inlet end of the associated apparatus.

Fig. 2 is a side elevation of Fig. 1.

Fig. 3 is an end elevation showing the inlet end of the apparatus in which the cans are heated or cooled.

Fig. 4 is a section, partially in elevation, in a vertical axial plane, showing certain details of the apparatus illustrated in Fig. 1. Fig. 4 shows a cradle for receiving a can from the conveyor and a valve which receives the can from the cradle, said valve being at the inlet end of the associated casing. In Fig. 4 the cradle is shown in position for receiving a can from the conveyor, and the valve is in the position in which it can deliver a can to the associated casing.

Fig. 5 shows the parts illustrated in Fig. 4, but in different relative positions. Fig. 5 shows how a can has been delivered from the conveyor to the cradle and how another can has been removed from the valve into the associated casing.

Fig. 6 is a view similar to Figs. 4 and 5 showing the can located in the cradle and showing how the valve has been turned in an arc of 90° from the position illustrated in Fig. 5.

Figure 7:
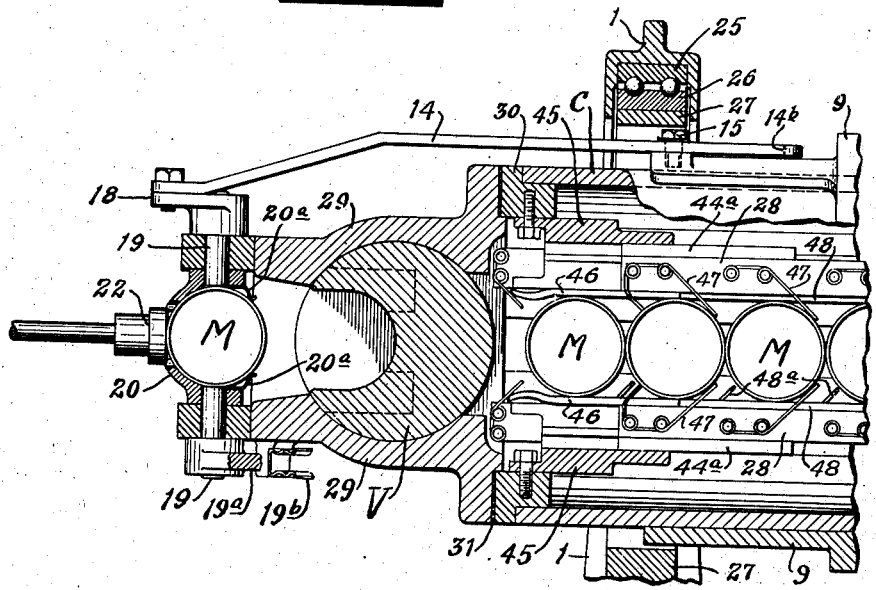

Fig. 7 shows the parts illustrated in Figs. 4-6, showing how the cradle has been turned in an arc of 90° from the position illustrated in Fig. 6, and showing how the valve has been turned through an arc of 90° from the position shown in Fig. 6, so that the pocket of the valve is now aligned with the cradle and with the plunger which transfers the can from the cradle to the valve.

Figure 8:
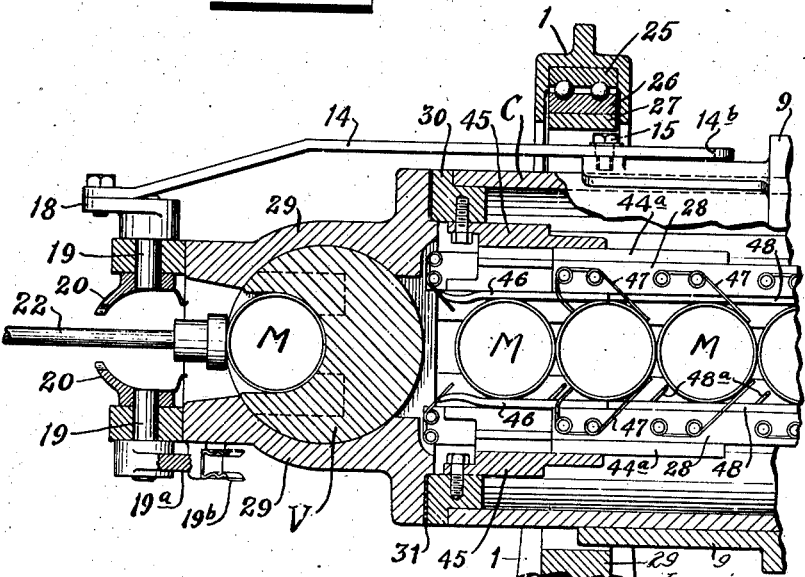

Fig. 8 is a view similar to Figs. 4-7 inclusive, showing how the plunger has been actuated to transfer the can from the cradle to the pocket of the valve.

Fig. 9 is a vertical elevation showing a major part of the machine, from the inlet end thereof.

Fig. 9A is a continuation of Fig. 9, showing the outlet end of the mechanism.

Fig. 10 is a sectional view on the line 10—10 of Fig. 9.

Fig. 11 is a top plan view showing the operating mechanism which actuates the various movable parts of the apparatus.

Fig. 12 is a sectional view on the line 12—12 of Fig. 9.

Figs. 13-17 are respectively elevations of the various control cams which control the movements of the essential parts of the mechanism.

Fig. 18 is a time chart which illustrates the sequence of the various operations and also the period of time which is required for each operation.

Figure 19:
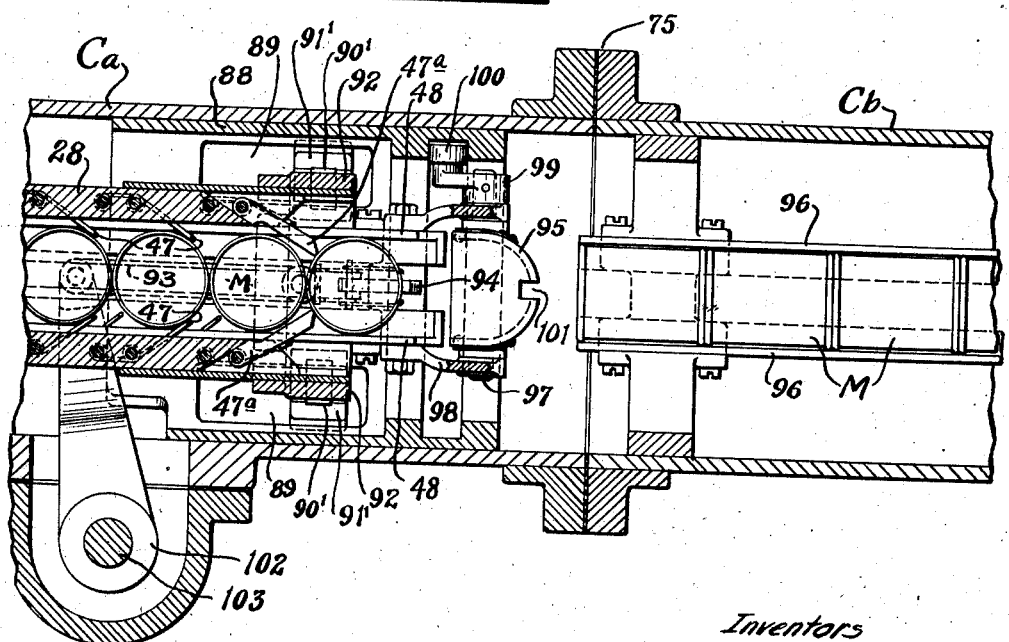

Fig. 19 is a sectional view, taken on a vertical plane, showing the details of the mechanism at the plane where the cans are transferred from rotating tracks to stationary tracks.

Figure 20:
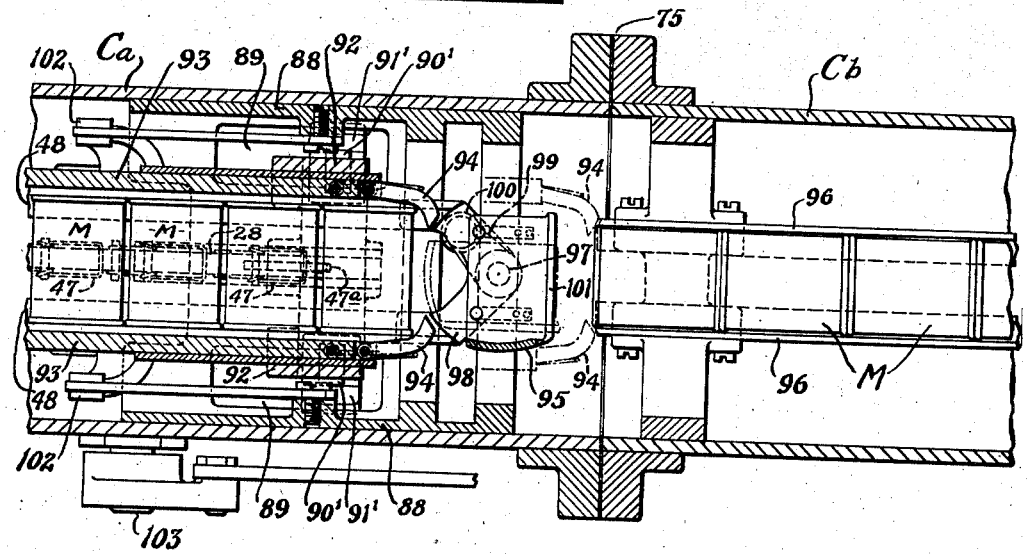

Fig. 20 is a sectional view, partially in elevation, of Fig. 19.

*Casing members*

The apparatus comprises a first casing C of cylindrical shape, which is mounted so that it can be turned around its longitudinal axis. Said casing C can thus be turned continuously in the same direction, at a rate of about 100 revolutions per minute. It will be understood that whenever any specific figures are given, they are given by way of example and not to limit the invention.

As shown in Fig. 2, the rear end of the first casing C communicates with a second casing Ca, which is stationary. These casings are made of any suitable metal.

The adjacent ends of the casings C and Ca have means which provide a tight joint. Whenever a tight joint is referred to, this means a joint which is both liquid-tight and gas-tight.

As shown at the right-hand side of Fig. 2, a ring 3 is welded or otherwise secured to the outer surface of the wall of the second casing Ca, so as to produce a tight joint. Packing rings 5 are located between a portion of the inner surface of the ring 3 and the adjacent surface of the rear end of the first casing C.

A turnable collar 4 can be threaded into the front end of the ring 3, so as to compress the packing rings 5 and thus provide a tight joint while permitting the first casing C to turn and also to move longitudinally relative to the second casing Ca. The second casing C can be turned continuously or intermittently in the same direction, or it can be rocked either continuously or intermittently. It can also be reciprocated or vibrated. If the cans have a height of about four inches or less, and diameter of three inches or less, it is preferable to turn first casing C continuously in the same direction. Such cans are generally made in two standard sizes, designated as "tall" and "baby." If larger cans are being processed, the other forms of motion may be used. Likewise, if ice cream mix is processed, the alternative forms of motion may be used, since this mix has greater viscosity than canned milk.

As shown in Fig. 20, the adjacent ends of the second and stationary casing Ca and of the third casing Cb are provided with metal collars which are welded to the outer surfaces of the walls of said casings, in order to produce a tight joint.

The casings Ca and Cb abut each other at a plane defined by the reference numeral 75 in Fig. 20. A packing ring may be provided at said plane.

The first casing C is turnably mounted in antifriction bearings which are provided in the frames 1 and 2, which are mounted upon the foundations 1a and 2a.

As shown in Fig. 4, each of these anti-friction bearings has an outer race 25 and an inner race 26 and intermediate ball-bearings. The inner race 26 abuts a ring 27 which is rigidly connected to the first casing C so that the ring 27 and the first casing C turn in unison.

*Means for feeding the cans of milk to the inlet end of the first casing C*

As shown in Fig. 1, the cans of milk M can be rolled along an inclined track 21, having vertical side walls, until the front can is stopped by the lip 24 which is provided at the end of said track 21. The front can M in Fig. 1 is in the transfer position. In this position said front can M can be transferred by the plunger 22 to the cradle 20, which is then in the position illustrated in Figs. 1, 2 and 4. The cans of milk may then be preheated. The ordinary preheating temperature is about 140° F.–145° F.

One of the vertical walls of the track 21 is broken away at the transfer point illustrated in Fig. 1 so that the can could be laterally transferred to the cradle 20.

Conventional spacing mechanism is provided for spacing the front can M from the other cans located on the track 21.

Said spacing mechanism comprises a spacing arm which is pivotally connected by the pivot pin 23c (see Fig. 11) to the track 21. Said arm is provided with upstanding stop arms 23a and 23b. These stop arms project through slots of track 21. As shown in Figs. 9 and 11, this spacing arm is rocked by means of an arm 23d, which is connected to a depending lug 23k of said spacing arm. As shown in Fig. 9, arm 23d is pivotally connected to arm 40 which is actuated by cam 40a, keyed to shaft 63.

Further details of this conventional spacing mechanism are not required, as this is old and well known per se.

As shown in Fig. 7, the cradle 20 is mounted upon a shaft 19 which is turnably mounted in a block which is an extension of valve casing 29. Said valve casing 29 is connected to an inlet ring 30, made of any suitable metal, and which is welded or otherwise connected to the inlet end of the first casing C so as to provide a tight joint. Hence cradle 20 and inlet valve V turn in unison with first casing C, around the axis of said casing. Valve V and cradle 20 are also rocked relative to first casing C, about axes which are respectively perpendicular to the axis of first casing C. A packing ring 31 provides a tight joint between the valve casing 29 and the ring 30.

As shown in Fig. 7, the cradle 20 is provided with spaced spring arms 20a. Hence, when the cradle is in the transfer position, as illustrated in Fig. 7 and Fig. 8, the plunger 22 can transfer the can M from the cradle 20 to the aligned pocket of the valve V.

As shown in Fig. 4, the rock shaft 19 of the cradle 20 is provided with an arm 18 which is pivotally connected to a link 14. As shown in Fig. 1, the link 14 has a slot 14b at its rear end. A pivot pin 15, whose shank extends through the slot 14b, connects said link 14 to the slide 9. The slide 9 is mounted to reciprocate longitudinally on the outer surface of first casing C, and to turn in unison with first casing C. Slide 9 is reciprocated by means of ring 9a.

Hence, when the slide 9 is reciprocated by means of mechanism later described herein, the cradle 20 is rocked, and there is a certain predetermined lost motion between the reciprocating movement of the slide 9 and the rocking movement of the cradle 20, said lost motion being determined by the length of the slot 14b.

As shown in Fig. 4, the rock shaft 19 of the cradle 20 is provided with an arm 19a which is yieldably and releasably engaged by a spring latch 19b when the cradle 20 is in the receiving position shown in Figs. 2 and 4. This spring latch 19b is connected to valve casing 29. This spring latch 19b holds the cradle accurately in the proper can-receiving position.

The valve V fits in a gas-tight and liquid-tight manner within the valve casing 29. Said valve is of cylindrical shape and it may be made of metal which has been accurately ground and polished so that it fits accurately within the corresponding portion of the valve 29.

The valve V is provided with gears 16 which are external to the casing 29. As shown in Fig. 2, these gears 16 mesh with racks 12 which are rigidly secured to the slide 9, so that the reciprocating movement of the slide 9 causes the rocking movement of the valve V.

The plunger 22 is first operated to transfer the front can M to the cradle 20, while the cradle is in the receiving position, as shown in Fig. 1. The cradle 20 is then turned through an arc of 90° until it assumes the position shown in Fig. 7 and Fig. 8.

The plunger 22 is then operated to transfer the can to the pocket of the valve V, as shown in Fig. 8. The mechanism for actuating the various parts in proper coordinated relation will be later described.

*Transfer mechanism for transferring the can from the valve to the casing C and for feeding the cans through the casing C*

As shown in Fig. 4, a casting 45 is located directly adjacent the ring 30. As shown in Fig. 12, said casting 45 is provided with arms 42 which are connected by means of screws or bolts 43 to the ring 30. The casting 45 therefore turns in unison with the first casing C. There may be any suitable number of said castings 45 throughout the length of the first casing C and these castings can be connected directly to the wall of the first casing C or to a suitable intermediate member.

As shown in Figs. 4, 10, and 12, transfer bars 28 are located within the first casing C. These transfer bars are diametrically opposed.

As shown in Figs. 4 and 12, these transfer bars 28 have enlarged heads 44a, which are slidably located in suitable grooves which are provided in the casting or castings 45. The bars 28 can thus be longitudinally reciprocated, and they turn in unison with the first casing C.

As shown in Fig. 4 and in Fig. 8, the front ends of the transfer bars 28 are provided with resilient and bent extensions 46. The valve V has recesses into which these extensions 46 can enter, so that said extensions 46 resiliently grip the can, and transfer the can from the first valve into the casing C.

As shown in Fig. 8 and Fig. 12, the transfer or feed bars 28 are also provided with the usual resilient push-fingers 47, so that when the transfer bars 28 are reciprocated in unison, these fingers 47 intermittently actuate the cans towards the rear of the first casing C.

The cans are supported on angular tracks 48 while said cans are fed through the first casing C. These tracks 48 are clearly shown in Fig. 12. These tracks 48 are also suitably connected by means of screws or bolts 43a to one or more annular castings 45, so that these tracks also turn in unison with the first casing C. These tracks 48 are provided with the usual resilient stop fingers 48a, which are shown in Fig. 5, and also in Fig. 12, so as to prevent any reverse movement of the cans M.

When the bars 28 are moved towards the inlet end of the first casing C, the resilient fingers 47 yield and move over the cans M, while the resilient stop-fingers 48a prevent any reverse movement of the cans.

As shown in Fig. 5, additional resilient stop-fingers are provided directly at the inlet end of the first casing C, in addition to the resilient stop-fingers 48a of the tracks 48.

The interior of the first casing C can be either heated or cooled in any suitable manner, depending whether the milk is to be processed by heating or cooling the same.

For example, steam under suitable pressure may be admitted into the first casing C, and the condensed steam can be carried off by means of valved ports which are located in the second and stationary casing Ca. Said ports are not shown, as such means are conventional and well known.

Likewise, a cooling liquid may be circulated under suitable pressure through the first casing C, by means of an inlet pipe and an outlet pipe, which can be connected to the second casing Ca.

Likewise, during the cooling, the air in the apparatus can be under suitable pressure above the normal atmospheric pressure, so as to bring the cans back to their original normal shape, if the ends of the cans have been bulged outwardly by the sterilization treatment. The pressure of the cooling liquid can accomplish the same purpose.

As shown in Figs. 19 and 20, the tracks 48 extend substantially up to the rear end of the second and stationary casing Ca, and the transfer bars 28, together with their push-fingers 47, also extend substantially up to the rear end of the second casing Ca.

The third and stationary casing Cb is provided with stationary tracks 96, as clearly shown in Figs. 19 and 20.

Referring to Fig. 19, the rear ends of the transfer bars 28 are provided with supplemental push-fingers 47a which can be rigid and which are pivotally connected to the bars 28. These end push-fingers 47a are biased by means of springs so that they are yieldingly held in the normal position illustrated in Fig. 19.

At the end of the second and stationary casing Ca, the cans are transferred from the rotating tracks 48 to an outlet or delivery cradle 95, which is shown in Figs. 19 and 20. The cans are transferred to this delivery cradle 95 by means of the transfer bars 28 and their supplemental fingers 47a.

The delivery cradle 95 is connected to pivot pins 97 which are turnably mounted in brackets 98, which are suitably secured to the tracks 48, so that the cradle 95 also turns in unison with the first casing C. These pivot pins 97 may be integral extensions of the cradle 95.

An angular arm 100 has a hub 99 which is rigidly connected to one of the pivot pins 97. This angular arm 100 has a roller which is located in a recess of a casting 88 which is longitudinally reciprocated within the second casing Ca. The cradle 95 can thus be rocked to a transfer position through an arc of 90°, from the receiving position shown in Figs. 19 and 20.

The cradle 95 is substantially similar in construction to the cradle 20, and in particular it has spring fingers like the fingers 20a.

Said cradle 95 is provided with a slot 101, to permit one of the push-fingers 94 to contact with the bottom of the can in said cradle 95, when said cradle 95 is in the transfer position. The other push-finger 94 then pushes against the top of the can, which extends above the top of cradle 95. The push-fingers 94 are connected to the push bars 93.

The push-fingers 94 are provided with suitable springs which bias them into the normal position shown in Fig. 20.

After the cans have been thus ejected from the cradle 95, said cans are deposited upon the tracks 96 of the third casing Cb.

The cans are pushed through the third casing Cb by means of push bars (not shown in detail), or other conventional mechanism, which may be similar to the mechanism previously described. These push bars are diagrammatically indicated in Fig. 9a by the reference numeral 106. The outlet valve 109 is similar in construction to the valve V, and said outlet valve 109 has a pocket 111. The outlet valve is rocked so as to drop the cans M upon a suitable endless conveyor 112.

The apparatus is therefore liquid-tight and gas-tight at its inlet and outlet, and at intermediate joints, so that there is no loss of gas, vapor, or liquid.

Operating mechanism

As shown in Fig. 11, the apparatus has a main driven shaft 49, whose pulley 50 is turned by any suitable motor. Shaft 49 extends through casing 51, in which conventional speed-change mechanism is located. This speed-change mechanism is driven by shaft 49 in any well-known manner, as by a gear or the like. Shaft 49 has a sprocket which is connected by a chain 52 to a sprocket of a second shaft 8. As shown in Fig. 1, shaft 8 has a gear 7 which meshes with the larger gear 6 of first casing C, in order to turn said first casing. The speed-change mechanism in casing 51 operates a shaft 53, which can thus be driven at different speeds relative to shaft 49. Shaft 53 is coupled by a suitable releasable clutch to a shaft 54.

As shown in Fig. 9, shaft 54 has worm 55, which meshes with worm gear 56 of shaft 57. As shown in Fig. 11, shaft 57 has a gear 58, which meshes with equal gear 59 of shaft 60.

Shaft 60 has a bevel gear 61, which meshes with bevel gear 62 of shaft 63. Cam 40a, which operates the spacing mechanism, is keyed to shaft 63. Cams 67 and 68 are keyed to shaft 60. These cams, like the other cams used in the apparatus, are discs which have cam grooves in their working faces.

Cam 67 rocks the shaft 69, which has an angular rock arm 10a, whose cam roller is located in the groove of cam 67. Said rock-shaft 69 has arms 10 which are also shown in Fig. 2. The ends of said arms 10 are provided with slots. Pins 11, connected to ring 9a, are located in said slots, so that arms 10 reciprocate slide 9.

As shown in Fig. 9, lever 70 is connected to shaft 71, and said lever 70 is connected to the plunger 22 by link 72. Lever 70 is rocked by link 73, which is reciprocated by cam 68, by means of a rock arm 10b which is mounted freely on shaft 69.

As shown in Figs. 9 and 10, a casting 74 is located movably in the second casing Ca. Said casting 74 has angular lugs which fit slidably on the angular rails 48. Said casting 74 therefore turns in unison with first casing C.

The casting 74 is spaced from the inner wall of casing Ca by means of balls 90, which are freely turnable in all directions. The length of casting 74 is sufficient to maintain it in contact with balls 90, during the reciprocating movement of casting 74. The balls 90 permit casting 74 to reciprocate and also to turn freely relative to the second and stationary casing Ca. The transfer bars 28 are connected to casting 74 by bolts or screws 76 (see Fig. 10), so that casting 74 and bars 28 reciprocate in unison.

As shown in Fig. 9, the casting 74 is provided with a circumferential groove intermediate its ends. As shown in Fig. 10, rolls 77 are located in said groove. These rolls 77 are mounted turnably at the ends of arms 78 (see Fig. 10) which are pivotally connected by pivot-pins 79 to a cap-casting 80 which is connected to the second casing Ca so as to make a tight joint.

The cap-casting 80 has the usual packing rings 81, which are compressed by member 82. Similar cap-castings are used in association with means for actuating other members which are reciprocated within the casings.

Shaft 79 is rocked by means of arm 83. As shown in Fig. 9, link 84 is pivotally connected to arm 83 and to an angular lever 85a, which is shown in Fig. 11 and whose hub is turnable on rod 86. One of the arms of angular lever 85a has the usual roll which is located in the groove of cam 65.

The casting 87 (see Fig. 9) is identical with casting 74. Casting 87 is actuated by means similar to the parts which reciprocate casting 74, including rock arm 87a and an angular arm 85b, whose hub is mounted turnably on rod 86 and which is actuated by cam 66. Casting 87 is connected to and it reciprocates the push-bars 93, which transfer the cans from cradle 95 to the stationary angular tracks 96 of the third and stationary casing Cb.

As shown in Fig. 19, casting 88 is mounted to reciprocate, but not to turn, within the second casing Ca. Said casting 88 has longitudinal slots 89 whose length exceeds the length of the longitudinal stroke of said casting 88.

The tracks 48 are secured to lugs of a ring 92 which is located adjacent the outlet end of second casing Ca. Ring 92 is spaced from the inner surface of the wall of second casing Ca by anti-friction rolls 90', which are turnably connected to brackets 91' of second casing Ca. The brackets 91' extend through the longitudinal slots 89 of casting 88, which is held against turning by any suitable means.

The rails 48 turn relative to the second and stationary casing Ca, about the common axis of the casings C, Ca and Cb, but said rails 48 do not reciprocate. Hence, by making the slots 89 of sufficient length, so that the end-walls of said slots do not contact with brackets 91' when casting 88 is reciprocated, the tracks are supported by ring 92 in their turning movement, adjacent the outlet end of second casing Ca.

Casting 88, which rocks cradle 95, as previously described, is connected by links to rock arms 102, mounted on rock-shaft 103 in a cap-casting. This rock-shaft 103 is connected by parts which include a link 104, to angular rock-arm 85, whose hub is mounted turnably on rod 86. Arm 85 is rocked by cam 64, keyed to shaft 57.

As shown in Fig. 9A, the push bars 106, which feed the cans through the third casing Cb, are connected to a casting 106a, which is connected by a link to rock-lever 107, connected turnably at 108 to a cap-casting of the third casing Cb. The rock-lever 107 is connected to link 105, which is reciprocated by cam 66. As shown in Fig. 11, this is done by means of an angular arm or lever 85b similar to lever 85a. The hub of lever 85b is mounted freely on rod 86. Lever 85b is rocked by cam 66, keyed to shaft 57.

As shown in Fig. 9A, the push bars 106 transfer the cans successively into the pocket 111 of the outlet valve 109, located in casing 110. Said valve is rocked by conventional means which are connected to rod or link 104, so that cam 64 operates valve 109, in addition to cradle 95.

Considering Figs. 13–17 consecutively, cam 68 operates push-bar 22. Cam 64 rocks cradle 95 and valve 109. Cam 67 reciprocates slide 9, thus actuating cradle 20 and valve V. Cam 66 operates bars 93 and 106. Cam 65 operates transfer bars 28.

The shafts 57, 60 and 63, which are geared in one-to-one ratio, so that they turn in unison and at the same speed, may be designated as the control shafts. A cycle of operations is performed at each complete revolution of said control shafts.

Fig. 18 shows a series of horizontal graphs illustrating the timing and relative periods of the various operations, during each cycle. The cans are advanced one step in the machine, during each cycle.

The cycle starts when the front can on inclined track 21 is held spaced from lip 24 by spacing means 23. The control shafts turn 90° in order to release the can, so that it abuts lip 24. This is indicated by the legend "can line advance" in Fig. 18.

The legend "can feed push bar" refers to the plunger 22. At the beginning of the cycle, said plunger 22 is at the left of the position shown in Fig. 2, in which the plunger is shown in contact with the can which is to be transferred to cradle 20. The plunger 22 is being returned to the position shown in Fig. 2, while the control shafts turn 40°. The plunger is held stationary during the next 50° of the cycle. The plunger 22 is then actuated to transfer the can to cradle 20, during the next 60°. The position of the can in the cradle is correspondingly identified by the legend in Fig. 18. The plunger is then held stationary during the next 10°, and it is then retracted or moved away from the cradle 20, while the shafts turn another 10°. This permits the cradle 20 to turn freely, without being obstructed by the plunger. The plunger then remains stationary during the next 50°. The plunger is then moved towards valve V, in order to transfer the can from cradle 20 to valve V, during the next 70°. It is then held stationary during the next 10°, and it is moved away from valve V during the next 60°.

The cradle 20 is identified by the legend "inlet cradle." This is inclined in the clockwise direction relative to the receiving position shown in Fig. 4, at the beginning of a cycle. The cradle 20 is turned counterclockwise to the receiving position shown in Fig. 4, during the first 20° of the cycle.

The cradle then remains stationary in the receiving position, while the control shafts turn an additional 160°. The cradle is then turned from the receiving position shown in Fig. 6 to the transfer position shown in Fig. 7, while the control shafts turn an additional 45°. The cradle is kept stationary in this transfer position, while the control shafts turn approximately 110°. The cradle is then turned from the transfer position shown in Fig. 7 towards the receiving position but not finally to said receiving position, while the control shafts turn approximately 25°.

The legend "inlet valve" refers to valve V. The pocket of said valve is out of the transfer position shown in Fig. 4, at the beginning of the cycle. The valve V is turned clockwise until its pocket is in said transfer position, during the first 20° of the cycle. The valve is then held stationary during the next 120°. The valve V is then turned a half-revolution to the receiving position shown in Fig. 7, during the next 85° of the cycle. It is held stationary during the next 65°, while the can is transferred to the valve from the cradle 20. The valve is then turned towards, but not finally to the position shown in Fig. 4, during the final 70° of the cycle.

The legend "inside transfer push bar" refers to the bars 28. These bars are held stationary, at the beginning of a cycle, while the control shafts turn 10°. Said bars are then to the right of the position shown in Fig. 4. The bars 28 are then moved reversely, or towards the inlet end of the first casing C, during the next 50° of the cycle, into the position shown in Fig. 4. The bars 28 are then held stationary during the next 10°. The position shown in Fig. 4 is indicated by the legend "grips can in valve."

The push bars are then moved to the right so as to feed all the cans in the casing C and Ca to the right, during the next 80°. This pushes the can at the end of tracks 48 into the cradle 95, as indicated by the legend "can in delivery cradle." The bars 28 are then held stationary during the next 15°. The bars are then moved towards the inlet end of casing C and valve V during the next 15°, so as to permit the delivery cradle 95 to turn freely. The bars 28 are then held stationary during the remaining 180° of the cycle, and as previously stated, said bars are also maintained stationary while the control shafts turn 10° during the next cycle.

The legend "delivery cradle" refers to the cradle 95. This cradle is turned counterclockwise to the receiving position shown in Figs. 19 and 20, during the first 75° of the cycle. The cradle 95 is then held stationary while the control shafts turn an additional 95°, during which period a can is pushed into said cradle by bars 28. The cradle is then turned to the transfer position, while the control shafts turn an additional 90°. The cradle 95 is then held stationary while the control shafts turn approximately 90°. The cradle is then turned reversely or towards the position shown in Figs. 19 and 20, while the control shafts turn approximately 10°, so as to complete a cycle. The cradle is finally turned back to the position shown in Figs. 19 and 20 during the first 75° of the next cycle, as previously stated.

The legend "delivery transfer" refers to the bars 93 which push the cans from the delivery cradle 95 to stationary tracks 96, and also to bars 106 which operate wholly in unison with bars 93. These bars 93 and 106 are moved in a direction towards the inlet end of casing C, during the first 130° of the cycle. The bars 93 and 106 are then held stationary while the control shafts turn an additional 130°. The bars 93 and 106 are then moved to push a can from cradle 95 to the stationary tracks 96, and also to push the last can on tracks 96 into valve pocket 111 by bars 106, while the control shafts turn an additional 90°. The bars 93 and 106 are then held stationary during the last 10° of the cycle. Said bars 93 and 106 are moved back to the position shown in Fig. 9A and Fig. 20, during the first 130° of the next cycle, as previously stated.

The legend "delivery valve" refers to the valve 109. This is turned counterclockwise to the position shown in Fig. 9a, during the first 75° of each cycle, as indicated by the legend "can drops out." Said cradle 109 is then held stationary while the control shafts turn the next 95°. The valve 109 is then turned clockwise, until its pocket 111 is aligned with tracks 96 in the casing Cb, while the control shafts turn the next 90°. The valve 109 is then held stationary while the control shafts turn approximately the next 90°. During approximately the last 10° of the cycle, the valve begins to turn counterclockwise towards the position shown in Fig. 9A. This counterclockwise turning is continued during the first 75° of the next cycle, until the valve has been finally turned to the position shown in Fig. 9A.

*Method of operation*

The description relates particularly to the treatment of cans of evaporated milk. As soon as a can has been transferred to the cradle 20, the can is turned around its own longitudinal axis in unison with valve V and casing C, thus causing the milk to move relative to the can, about the common axes of casing C and tracks 48. The can is promptly turned 90° to the position shown in Fig. 7. Since the milk does not fill the can completely, the milk moves relative to the can, in a direction parallel to the axis of the can, in addition to the tumbling movement of the can. This relative combined tumbling and dropping movement is thus started before the milk is heated to a temperature which may affect it injuriously, and this movement is continued until the cans are delivered to tracks 96.

While the invention is not restricted to the use of a can of any particular shape, the method may, for convenience, be described with reference to cylindrical cans. When the cradle is turned to the position shown in Fig. 7, the can is turned about an axis which is perpendicular to the longitudinal axis of the can and the axis of casing C. This turning of the can through an arc of 90°, causes the milk to move relative to the can around an axis which is perpendicular to the axis of the can. This relative movement of the milk continues after the cradle 20 is held stationary relative to casing C, due to the inertia of the milk. Likewise, while the cradle 20 is held stationary relative to casing C, the cradle 20 turns in unison with said casing, so that the milk continues to move relative to the can, about an axis which is perpendicular to the longitudinal axis of the can. While the can is being transferred to valve V, said relative movement of the milk continues. While the valve V is being turned, and when the valve is in the transfer position shown in Fig. 4, the axis of the can remains perpendicular to the axis of C. Hence the milk is maintained in "end-over-end" and sliding or dropping movement relative to the can, while it is transferred to tracks 48, and as long as the cans are on tracks 48.

The volume of the milk may be approximately 93% percent of the total inside volume of the can. The mechanism above described causes a thorough agitation of the contents of the can, before it enters the inlet casing C and while it is located in cradle 20 and valve V. If the casing C and tracks 48 are turned at a rate of about 100 revolutions per minute (which may be greatly varied), the agitation of the milk is sufficient to keep it moving continuously relative to the inner surface of the can without forming excessive foam. The movement of the milk relative to the can is maintained until the temperature of the milk has been raised substantially to the temperature of the heating zones. This prevents the milk from baking on the can, while the temperature of the milk is being raised.

When the temperature of the milk is thus substantially equal to the temperature of the can and to the temperature of the heating zone, the end-over-end movement can be stopped without danger of the milk baking on the can during the holding period.

Prior to their transfer to the cradle 20, the cans may be preheated rapidly or slowly to a temperature of 210° F. This temperature may be greatly varied, but it is preferably above 200° F.

While the cans are being fed through the casing C, the axis of revolution of said casing is perpendicular to the longitudinal axis of the cans, so that the cans are turned end-over-end. Likewise, and as previously stated, the casing C can be turned intermittently or it can be rocked, or it can be reciprocated in addition to being turned or rocked.

While the cans are passing through the casing C, if unsweetened evaporated milk in liquid form is being processed, their temperature is raised rapidly to about 260° F. This temperature may be higher and as high as 275° F., but it is preferred to have a temperature of 260° F. for the cans and their contents and to raise the cans and their contents to said temperature in a relatively short period, as about forty-five (45) seconds. If unsweetened evaporated milk in liquid form is being processed, said milk will not bake on the interior walls of the cans until its temperature has been raised above substantially 200° F. Milk can be heated to a temperature as high as 210° F., without objectionable results. However, it is highly desirable to produce relative movement between the cans and the unsweetened evaporated milk, prior to starting the sterilizing treatment, which consists in raising the temperature of the milk and of the cans substantially above 210° F., and up to about 260° F.

If fruit juices are processed, the above factors may be varied, depending on the type of fruit juice.

The casings C, Ca and Cb are heated by means of steam, which is supplied to the interior of said casings, and said steam may have a temperature of about 270° F. The means for supplying the casings C, Ca and Cb with live steam at a suitable high temperature are not shown, since such means are conventional. Said three casings form a unit which is maintained at the same temperature.

When the cans and their contents have reached a temperature of about 260° F., said cans are transferred from tracks 48 to the stationary tracks 96 so that the turning of the cans is stopped. Although the cans are fed forwardly on said stationary tracks 96, the forward feeding movement of the cans is negligible in accomplishing any substantial agitation of the milk. For all practical purposes, the cans may be considered as being stationary while they are being moved along the stationary tracks. While the cans are thus maintained substantially stationary, from the viewpoint of the processing of the milk, said cans are maintained at the required temperature, which may be 260° F. or above, for a period of three minutes to three and one-half minutes. The period during which the cans are moved along on the stationary tracks may be as low as one minute and as high as four minutes.

Experience has shown that when the cans are transferred to the stationary tracks, after the maximum high sterilization temperature has been rapidly secured, further turning of the cans would tend to coagulate the milk. The period during which the cans are moved along the stationary tracks may be designated as the "holding" period, but the sterilization of the milk may be, and preferably is completed during the first part of said holding period. There may be a slight rise in temperature during this holding period. This rise in temperature is much less than the first rise in temperature from 210° F. to 260° F.

Most milk is effectively sterilized prior to the completion of the holding period, and approximately during the first fifteen seconds of the holding period. The additional portion of the holding period improves the stability and other characteristics of the milk, so that the milk will not coagulate, even if it is stored for several months. Likewise, the milk is given the required body and viscosity.

After the milk has thus been treated in the apparatus herein disclosed, it may be transferred to an identical mechanism in which the interiors of the casings are provided with a cooling gas or cooling vapor or cooling liquid, so as to cool the milk. In the next piece of apparatus, the milk is cooled to a temperature of about 90° F. to 100° F., while the cans are turned by means of the tracks 48. The cans can be turned around an axis which is perpendicular to the longitudinal axes of the cans, at a rate of 100 revolutions per minute. This gives the cans the same end-over-end movement as previously described and this accelerates the cooling. The use of the stationary tracks is not important, and such use is not required during the cooling treatment.

If desired, the cooling liquid which is supplied to the interior of the apparatus may exert sufficient pressure to restore the cans to their original shape, since the effect of the heat treatment during sterilization may be to bulge the cans outwardly. The cooling liquid may be supplied in the form of a spray directed on the cans and this liquid is forced into the apparatus until the required pressure has been built up. The cooling liquid may be cold water which can be circulated throughout the cooling apparatus in a closed system, using a pump or the like. This conventional detail is not shown in the drawings.

Likewise, during the cooling period, the cans can be brought back to their original shape by air under suitable pressure. Air under pressure produces an internal pressure in a leaky can which helps in detecting leakers, by bulging them outwardly after the external pressure has been released. The cans are maintained in an atmosphere whose pressure exceeds the internal pressure of the cans for a period which is sufficiently long to cause said air to enter the cans. If the outside pressure is then released rapidly, or if the can is quickly moved out of the apparatus into the outer atmosphere, the air within the can causes leakers to bulge outwardly, whereby defective cans can be scanned and rejected by the operator either with or without auxiliary means.

As the cans are moved away from the apparatus by means of the conveyor 112, each can can be scanned by a beam of light which falls on a photo-electric cell. If the top of the can is bulged excessively, thus indicating a leaking or defective can, said bulged top will interrupt the beam of light, so that the photo-electric cell will automatically cause the operation of means which will eject the cans from the conveyor 112. Such photo-electric scanning mechanism is well-known per se, so that it is not described herein.

While we have shown a complete embodiment of an automatic machine which represents the best form of our invention, and which is continuous in operation (although the cans are fed intermittently through the casings), our invention includes numerous valuable independent combinations and sub-combinations which may be used wholly independently of the complete machine illustrated herein.

Therefore we do not wish to be limited to the complete embodiment illustrated herein as numerous changes and omissions can be made without departing from the spirit of the invention.

While the invention is particularly useful in sterilizing and processing evaporated milk, it is applicable to other products. Therefore, whenever the claims refer to the processing of canned milk, the claims cover the use of the method and mechanism protected by the claims for processing other products, which may be food products or of other kinds. These food products may be soups, fruit juices or any other food.

A number of the mechanical movements and methods steps specified herein are applicable to processing the cans of milk or other food in a batch heater or cooler in which a suitable number of cans are maintained while the cans are being heated or cooled. The cans can be turned end-over-end, etc., during the treatment by the batch method, but the cans are not moved longitudinally in the batch heater or cooler during the processing. However by following the disclosure herein, the milk in the can will have a suitable movement relative to the wall of the can prior to the admission of the heating or cooling media and during the sterilization. That is, in a batch system, an enclosed chamber is filled with cans before admitting the heating and cooling media.

In the embodiment illustrated herein, the casing C is turned, in order to turn the cans end-over-end. However, it would be an obvious equivalent to turn the tracks or other supports on which the cans were located within the casing, relative to the casing, in order to produce the same result.

Therefore, whenever the rotation of the casing is referred to in the claims, this generally includes the rotation of the member or members which serve to support the cans.

Likewise, whenever we refer to causing the milk to move relative to the can, either in an end-over-end movement or in some other type of movement, this does not mean that the can must be continuously turned or otherwise moved. The milk has sufficient inertia to continue its movement relative to the can even if the movement of the can is stopped during a short period.

Likewise, whenever specific temperatures are referred to in the claims, it is to be understood that there can be a reasonable variation from said specific temperatures without departing from the scope of the claims.

Whenever cam means are referred to in the description or in the claims for moving the various parts of the mechanism in timed relation and sequence, said cam means are merely illustrative of numerous well known types of control means so that the designation "cam means" includes electrical means, hydraulic means, pneumatic means and the like which will accomplish the same purpose. The cradle 20 and the valve V may be severally designated as can-feeding devices which are connected to the casing so as to be turnable in unison therewith and which are also turnable relative to the casing.

In Fig. 10, and in other figures, one of the legs of the angular rail, such as rail 48 in Fig. 10, is parallel to the circular base of the can, and the other leg is parallel to the longitudinal wall of the can. Some space may be provided between the vertical wall of the can and the adjacent legs of said angular tracks in order to allow for the lateral bulging of the vertical wall of the can. This will permit perfectly cylindrical cans to move relative to said angular holding tracks. As said relative movement is undesirable, the legs of the rails may be inclined respectively to the base of the can and its vertical wall, or the can may be prevented from shifting relative to the rails in any suitable manner. Otherwise objectionable foam is produced in the milk within the cans particularly in the early stage of the treatment. If the rails shown in Fig. 10 were turned in the plane of the paper, so that the legs of each rail were inclined to the vertical direction of Fig. 10, the base of the can will rest upon the free edge of the bottom legs, and the circumference of said base will abut the other legs. This will prevent relative movement of the cans relative to rails, because the periphery of the circular base and the circular top of the can will abut legs of the rails 48. The can can bulge laterally between its top and bottom, without binding.

We claim:

1. In the art of processing milk which is contained in a can of substantially cylindrical shape, in a zone of heating, that step which consists in producing a relative end-over-end movement between the milk and the can prior to and also during the entry of the can into said zone so that said end-over-end movement is produced at the time the can enters said zone.

2. In the art of processing milk which is contained in a can of substantially cylindrical shape, in a zone of heating, that step which consists in producing a relative end-over-end movement between the milk and the can prior to and also during the entry of the can into said zone, so that said end-over-end movement is produced at the time the can enters said zone and continuing said end-over-end movement of the milk relative to the can in said zone of heating.

3. In the art of heat-processing milk in a cylindrical can, in a zone of heating, those steps which consist in first turning the can around its longitudinal axis, then turning the can about an axis transverse to said longitudinal axis, and then turning the can around an axis which is substantially perpendicular to and which is spaced laterally from the longitudinal axis of the can, the can being thus turned immediately prior to the entry of the can into the zone of heating so as to produce a relative movement between the milk and the can as the result of said turning movements which is maintained during the entry of the can into said zone of heating.

4. In the art of processing milk which is contained in a can of substantially cylindrical shape, in a zone of heating, those steps which consist in producing a relative end-over-end movement between the milk and the can prior to and during the entry of the can into said zone, so that said end-over-end movement is produced at the time the can enters said zone, and continuing said end-over-end movement of the milk relative to the can in said zone of heating, by turning the cans about an axis which is transverse to their longitudinal axes, in said zone of heating.

5. In the art of processing milk which is contained in a can of substantially cylindrical shape, in a zone of heating, that step which consists in producing a relative end-over-end movement between the milk and the can prior to and during the entry of the can into said zone, so that said end-over-end movement is produced at the time the can enters said zone, and continuing said end-over-end movement of the milk relative to the can in said zone of heating, by turning the cans about an axis which is transverse to their longitudinal axes, in said zone of heating, while feeding the cans through said zone of heating.

6. In the art of heat-processing canned milk, those steps which consist in producing relative movement between the milk and the cans while the milk is sterilized at a temperature substantially above 100° C., during a first time-period, and then maintaining the milk substantially stationary relative to the cans at a temperature substantially above 100° C. during a second time-period which is longer than the first time period.

7. In the art of heat-processing milk, those steps which consist in raising the temperature of the cans of milk from approximately 210° F. to approximately 260° F. in a period of approximately 45 seconds and while the cans are turned around an axis which is perpendicular to their longitudinal axes so that continuous movement of the milk relative to the cans is maintained, and then maintaining the cans at approximately said temperature of 260° F. for a period of approximately one minute to four minutes and without substantially turning the cans during the second period.

8. In the art of sterilizing milk in cans, those steps which consists in subjecting the cans of milk to a sterilizing temperature which is above 210° F. during a first time-period during which the cans are moved so as to produce relative movement between the milk and the cans, and completing the sterilization during a second time-period in which the milk is maintained substantially stationary relative to the cans.

9. In the art of processing a can of milk by changing the temperature thereof in a zone, that step which consists in producing relative movement between the milk and the can immediately prior to the entry of the can into said zone and during the entry of the can into said zone, so that the milk is moving relative to the can at the time the can enters said zone, and also maintaining said relative movement between the milk and the can while the can is located in said zone, said relative movement being an end-over-end movement.

10. In the art of sterilizing liquid canned evaporated milk which is contained in cans of substantially cylindrical shape by heating the milk and the cans above 210° F., that step which consists in giving said cans an end-over-end movement in order to secure relative movement between the cans and said contents thereof, prior to subjecting the cans and said milk therein to a temperature substantially above 210° F., and also during the sterilizing heat treatment.

HARRY L. GRIFFIN.
ALEXANDER R. ROBB.
ROLLA W. TITUS.
HANS T. GEBHARDT.